(12) United States Patent
Bordner et al.

(10) Patent No.: US 7,328,211 B2
(45) Date of Patent: Feb. 5, 2008

(54) SYSTEM AND METHODS FOR IMPROVED LINGUISTIC PATTERN MATCHING

(75) Inventors: Ty Bordner, Adamstown, MD (US); Derrick Cobey, Bowie, MD (US); Michael Finney, Phenix, VA (US)

(73) Assignee: JPMorgan Chase Bank, N.A., New York, NY (US)

( * ) Notice: Subject to any disclaimer, the term of this patent is extended or adjusted under 35 U.S.C. 154(b) by 782 days.

(21) Appl. No.: 09/957,465

(22) Filed: Sep. 21, 2001

(65) Prior Publication Data

US 2002/0099536 A1 Jul. 25, 2002

Related U.S. Application Data

(60) Provisional application No. 60/234,215, filed on Sep. 21, 2000.

(51) Int. Cl.
G06F 17/30 (2006.01)

(52) U.S. Cl. .......................................................... 707/6
(58) Field of Classification Search .................... 707/3, 707/4, 5, 6; 704/8, 9, 243
See application file for complete search history.

(56) References Cited

U.S. PATENT DOCUMENTS

| | | | |
|---|---|---|---|
| 3,872,448 A | 3/1975 | Mitchell, Jr. | |
| 4,833,610 A | 5/1989 | Zamora et al. ................. | 707/5 |
| 5,159,687 A | 10/1992 | Richburg | |
| 5,168,444 A | 12/1992 | Cukor et al. | |
| 5,278,982 A | 1/1994 | Daniels et al. | |
| 5,313,616 A | 5/1994 | Cline et al. | |
| 5,347,518 A | 9/1994 | Lee | |
| 5,404,507 A * | 4/1995 | Bohm et al. ................... | 707/4 |
| 5,455,946 A | 10/1995 | Mohan et al. | |
| 5,630,173 A | 5/1997 | Oprescu | |
| 5,701,471 A | 12/1997 | Subramanyam | |
| 5,724,597 A | 3/1998 | Cuthbertson et al. ........ | 715/531 |
| 5,737,723 A | 4/1998 | Riley et al. ................. | 704/243 |
| 5,748,878 A | 5/1998 | Rees et al. | |
| 5,752,034 A | 5/1998 | Srivastava | |
| 5,752,242 A * | 5/1998 | Havens .......................... | 707/3 |

(Continued)

FOREIGN PATENT DOCUMENTS

WO WO 95/03586 2/1995

(Continued)

OTHER PUBLICATIONS

Intelligent Search Technology, Ltd. "The Brains Behind Intelligent Search Systems," 1999, (18 pages).

(Continued)

*Primary Examiner*—Apu Mofiz
*Assistant Examiner*—Kavita Padmanabhan
(74) *Attorney, Agent, or Firm*—Hunton & Williams LLP

(57) ABSTRACT

A system and method for reducing the number of false negatives with minimal impact on false positive search results while allowing searches to return phonetic equivalents, misspellings, common short names, and other such applicable information. New, N-Gram based indexing and search systems and methods facilitate searching of data containing non-Arabic letters, such as numbers, symbols, and foreign language characters. Ability to customize indexing and other features further enhance search results. Linguistic pattern matching search results are improved based on dynamically modified search attributes.

12 Claims, 2 Drawing Sheets

U.S. PATENT DOCUMENTS

| | | |
|---|---|---|
| 5,758,061 A | 5/1998 | Plum |
| 5,764,972 A | 6/1998 | Crouse et al. |
| 5,774,553 A | 6/1998 | Rosen |
| 5,784,557 A | 7/1998 | Oprescu |
| 5,787,402 A | 7/1998 | Potter et al. |
| 5,828,883 A | 10/1998 | Hall |
| 5,832,523 A | 11/1998 | Kanai et al. |
| 5,835,770 A | 11/1998 | Shum et al. |
| 5,845,293 A | 12/1998 | Veghte et al. |
| 5,872,976 A | 2/1999 | Yee et al. |
| 5,907,846 A | 5/1999 | Berner et al. |
| 5,920,719 A | 7/1999 | Sutton et al. |
| 5,978,477 A | 11/1999 | Hull et al. |
| 6,009,405 A | 12/1999 | Leymann et al. |
| 6,014,671 A | 1/2000 | Castelli et al. |
| 6,026,237 A | 2/2000 | Berry et al. |
| 6,029,002 A | 2/2000 | Afifi et al. |
| 6,058,393 A | 5/2000 | Meier et al. |
| 6,065,009 A | 5/2000 | Leymann et al. |
| 6,081,808 A | 6/2000 | Blackman et al. |
| 6,108,698 A | 8/2000 | Tenev et al. |
| 6,125,390 A | 9/2000 | Touboul |
| 6,138,112 A | 10/2000 | Slutz |
| 6,145,121 A | 11/2000 | Levy et al. |
| 6,163,776 A | 12/2000 | Periwal |
| 6,167,398 A | 12/2000 | Wyard et al. ........... 707/5 |
| 6,188,400 B1 | 2/2001 | House et al. |
| 6,226,652 B1 | 5/2001 | Percival et al. |
| 6,237,143 B1 | 5/2001 | Fontana et al. |
| 6,243,862 B1 | 6/2001 | Lebow |
| 6,246,977 B1 | 6/2001 | Messerly et al. ........... 704/9 |
| 6,256,635 B1 | 7/2001 | Arrouye et al. |
| 6,263,121 B1 | 7/2001 | Melen et al. |
| 6,269,189 B1 | 7/2001 | Chanod ........... 382/229 |
| 6,269,479 B1 | 7/2001 | Puram |
| 6,272,456 B1 | 8/2001 | de Campos ........... 704/8 |
| 6,279,008 B1 | 8/2001 | Tung Ng et al. |
| 6,301,701 B1 | 10/2001 | Walker et al. |
| 6,311,320 B1 | 10/2001 | Jibbe |
| 6,311,327 B1 | 10/2001 | O'Brien et al. |
| 6,336,122 B1 | 1/2002 | Lee et al. |
| 6,356,920 B1 | 3/2002 | Vandersluis |
| 6,381,609 B1 | 4/2002 | Breitbart et al. |
| 6,385,618 B1 | 5/2002 | Ng et al. |
| 6,397,221 B1 | 5/2002 | Greef et al. |
| 6,405,209 B2 | 6/2002 | Obendorf |
| 6,411,957 B1 | 6/2002 | Dijkstra |
| 6,418,446 B1 | 7/2002 | Lection et al. |
| 6,418,448 B1 | 7/2002 | Sarkar |
| 6,418,451 B1 | 7/2002 | Maimone |
| 6,449,623 B1 | 9/2002 | Bohannon et al. |
| 6,453,310 B1 | 9/2002 | Zander |
| 6,456,995 B1 | 9/2002 | Salo et al. |
| 6,467,052 B1 | 10/2002 | Kaler et al. |
| 6,477,540 B1 | 11/2002 | Singh et al. |
| 6,490,581 B1 | 12/2002 | Neshatfar et al. |
| 6,502,095 B2 | 12/2002 | Breitbart et al. |
| 6,502,104 B2 | 12/2002 | Fung et al. |
| 6,529,892 B1 * | 3/2003 | Lambert ........... 706/55 |
| 6,532,467 B1 | 3/2003 | Brocklebank et al. |
| 6,535,894 B1 | 3/2003 | Schmidt et al. |
| 6,539,337 B1 | 3/2003 | Provan et al. |
| 6,539,383 B2 | 3/2003 | Charlet et al. |
| 6,539,397 B1 | 3/2003 | Doan et al. |
| 6,539,398 B1 | 3/2003 | Hannan et al. |
| 6,557,039 B1 | 4/2003 | Leong et al. |
| 6,571,249 B1 | 5/2003 | Garrecht et al. |
| 6,574,640 B1 | 6/2003 | Stahl |
| 6,578,129 B1 | 6/2003 | da Silva Junior et al. |
| 6,591,260 B1 | 7/2003 | Schwarzhoff et al. |
| 6,601,075 B1 | 7/2003 | Huang et al. |
| 6,618,727 B1 * | 9/2003 | Wheeler et al. ........... 707/10 |
| 6,651,076 B1 | 11/2003 | Asano |
| 6,665,086 B2 | 12/2003 | Hull et al. |
| 6,678,705 B1 | 1/2004 | Berchtold et al. |
| 6,681,380 B1 | 1/2004 | Britton et al. |
| 6,691,139 B2 | 2/2004 | Ganesh et al. |
| 6,697,835 B1 | 2/2004 | Hanson et al. |
| 6,701,514 B1 | 3/2004 | Haswell et al. |
| 6,711,594 B2 | 3/2004 | Yano et al. |
| 6,714,219 B2 | 3/2004 | Lindhorst et al. |
| 6,757,866 B1 * | 6/2004 | Dey et al. ........... 715/500.1 |
| 2002/0007287 A1 | 1/2002 | Straube et al. |
| 2002/0007335 A1 * | 1/2002 | Millard et al. ........... 705/37 |
| 2002/0029228 A1 | 3/2002 | Rodriguez et al. |
| 2002/0038226 A1 | 3/2002 | Tyus |
| 2002/0038320 A1 | 3/2002 | Brook |
| 2002/0049666 A1 | 4/2002 | Reuter et al. |
| 2002/0065695 A1 | 5/2002 | Francoeur et al. |
| 2002/0083034 A1 | 6/2002 | Orbanes et al. |
| 2002/0091702 A1 | 7/2002 | Mullins |
| 2002/0116205 A1 | 8/2002 | Ankireddipally et al. |
| 2002/0143774 A1 | 10/2002 | Vandersluis |
| 2002/0144101 A1 | 10/2002 | Wang et al. |
| 2002/0178439 A1 | 11/2002 | Rich et al. |
| 2002/0188765 A1 | 12/2002 | Fong et al. |
| 2003/0014421 A1 | 1/2003 | Jung |
| 2003/0018666 A1 | 1/2003 | Chen et al. |
| 2003/0027561 A1 | 2/2003 | Iyer |
| 2003/0046313 A1 | 3/2003 | Leung et al. |
| 2003/0050931 A1 | 3/2003 | Harman et al. |
| 2003/0069975 A1 | 4/2003 | Abjanic et al. |
| 2003/0070158 A1 | 4/2003 | Lucas et al. |
| 2003/0088593 A1 | 5/2003 | Stickler |
| 2003/0126151 A1 | 7/2003 | Jung |
| 2003/0131007 A1 | 7/2003 | Schirmer et al. |
| 2003/0140045 A1 | 7/2003 | Heninger et al. |
| 2003/0140308 A1 | 7/2003 | Murthy et al. |
| 2003/0145047 A1 | 7/2003 | Upton |
| 2003/0163603 A1 | 8/2003 | Fry et al. |
| 2003/0167266 A1 | 9/2003 | Saldanha et al. |
| 2003/0167445 A1 | 9/2003 | Su et al. |
| 2003/0177118 A1 | 9/2003 | Moon et al. |
| 2003/0177341 A1 | 9/2003 | Devillers |
| 2003/0191849 A1 | 10/2003 | Leong et al. |
| 2003/0217033 A1 | 11/2003 | Sandler et al. |
| 2003/0217083 A1 | 11/2003 | Taylor |
| 2004/0122872 A1 | 6/2004 | Pandya et al. |
| 2005/0027658 A1 | 2/2005 | Moore et al. |
| 2005/0060345 A1 | 3/2005 | Doddington |
| 2005/0065987 A1 | 3/2005 | Telknowski et al |

FOREIGN PATENT DOCUMENTS

| | | |
|---|---|---|
| WO | WO 96/34350 | 10/1996 |
| WO | WO 02/46980 | 6/2002 |

OTHER PUBLICATIONS

Duggan, 2.40 General—Reviews and Abstracts, SPI Database of Software Technologies, p. 1-5, Feb. 1, 1974.

Hellerstein, A Generalized Search Tree for Database Systems, Jan. 19, 1996, 28 pages.

Deng et al., A Probabilistic Approach to fault Diagnosis in Linear Lighwaves Network, Department of Electrical Engineering, May 1992, pp. 1-22.

Sammet, Beginning of 4.6 Software Evaluation, Tests and Measurements and RMF I/O Time Validation, Association of Computing Machinery, p. 519, Nov. 1, 1981.

Xu, ERDraw: An XML-based ER-diagram Drawing and Translation Tool, no date, 4 pages.

VanBommel, Genetic Algorithms for Optimal Logical Database Design Information and Software Technology, vol. 36, No. 12, p. 725-732, 1994.

Strom et al., Gryphon: An Information Flow Based Approach to Message Brokering, International Symposium on software Reliability, Jun. 20, 2005, 2 pages.

Hilbert, Hilbert, et al., An Approach To Large Scale Collection Of Application Usage Data Over the Internet, Software Engineering 1998, Proceedings of the 1998 International Conference, Abstract, Apr. 1998, 1 page.

Chen, Improving Index Performance through Prefetching School of Computer Science Carnegie Mellon University, Dec. 2000, 26 pages.

Van Steen, Model for Worldwide Tracking of Distributed Objects, VRIJE Universiteit, Amsterdam, no date, 10 pages.

Quantitative Monitoring Of Software Development by Time-Based and Intercheckpoint Monitoring, Software Engineering Journal, vol. 5, Iss. 1, p. 43-49, Abstract, Jan. 1990.

Moser, Transactions in a Distributed Object Environment, Department of Electrical and Computer Engineering, Jun. 19, 2005, 4 pages.

Ramakrishnan, Tree-Structured Indexes Module 2, Lectures 3 and 4, no date, 26 pages.

* cited by examiner

SYSTEM AND METHODS FOR IMPROVED LINGUISTIC PATTERN MATCHING

The present application claims priority from U.S. Provisional Patent Application No. 60/234,215 filed on Sep. 21, 2000 which is incorporated herein by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to the field of linguistic pattern matching for database retrieval purposes.

BACKGROUND OF THE INVENTION

Typographical errors, phonetic misspellings, abbreviations, common short-names, and sequence variation are but a few of the problems facing searchers of computerized records. For example, when calling directory assistance, if a request is made for the telephone number of Thomas Lee, without spelling either name, a telephone operator may search for Tomas Leigh, Thomas Lea, or any of several combinations thereof. In addition, when Thomas Lee was entered into the database, he may have accidentally been entered as Lee Thomas, and either or both of his names may have been misspelled.

The task of properly searching a computerized database becomes even more complex when names comprised of foreign characters are used. Examples of such databases include those containing genealogical records, foreign city names, foreign names, or company names.

To overcome these problems, some in the prior art have created techniques involving character manipulation. Soundex, which is one of the most widely used of these techniques, is a simple process of associating certain letters with numbers, and dropping other letters. A search is performed on the result, and that search may yield names that sound like or otherwise approximate the name in question.

Others in the prior art have described schemes through which result sets may be generated based on manipulation of an input word. One such technique, disclosed by U.S. Pat. No. 4,833,610 by Antonio Zamora, et. al., separates and alphabetizes the consonants and vowels of a given word, and compares a transformed input string to transformed database entries. Another technique, disclosed by U.S. Pat. No. 5,737,723 by Michael Dennis Riley et. al., compares dictionary words based on the phonetic confusability of the words. Still another method, disclosed by U.S. Pat. No. 5,724,597 by Robert John Cuthbertson et. al., involves successively applying Soundex and other techniques and generating a match list based on the results.

While Soundex and other such schemes may allow the reporting of "near matches," the number of false positives reported by these schemes can prohibit their use in large databases. For example, in a database of 1000 names, if the Soundex routine had a false positive rate of 0.005, only two false names would be returned. However, when the database grows to 100,000 names, over two hundred false positives are reported.

SUMMARY OF THE INVENTION

The present invention improves upon the prior art by reducing the number of false positive search results while allowing searches to return phonetic equivalents, misspellings, common short names, and other such applicable information. In addition, the present invention allows the searching of names containing non-Arabic letters, such as numbers, symbols, and foreign language characters.

The present invention further provides an improved linguistic search by applying not only those techniques used in the prior art, such as Soundex, but also new techniques. One such new technique is an N-Gram search. An N-Gram is a subsequence of N characters from the full word which is used for indexing. For example, the word "example" has the following N-Gram's, where N=3: "exa", "xam", "amp", "mpl", and "ple."

In a preferred embodiment, the present invention may be customized to enhance search results by allowing users to tune the present invention based on user data. By way of example, without intending to limit the present invention, users may select the number of characters to be contained in each N-Gram, and users may also select between types of N-Grams used by the present invention. N-Gram types available may include, but are not limited to, Alphabetic, Consonant, FDI, FML, and Numeric.

Customized search results may be further refined by evaluating matches based on user preferences. One method employed by the present invention to evaluate matches is the Edit Distance method. The Edit Distance method calculates the number of characters which must be inserted, deleted, changed, or transposed in one word to obtain a match with another word, and accepts or rejects results based on the Edit Distance. For example, the edit distance between "Michael" and "Mikhail" is 2 (replace "c" by "k" and "e" by "i").

In addition to a user-customized configuration, the present invention may also be configured to dynamically select configuration options. Dynamic selection allows the present invention to modify sensitivity levels based on search string attributes, such as, but not limited to, search string length. Search sets resulting from such dynamic selections may also be refined as described in the previous paragraph.

The present invention overcomes limitations and problems with conventional linguistic pattern matching system by providing a system and methods for comparing a query against data contained within a database comprising the steps of: (a) receiving the query; (b) converting a plurality of information from the query, by at least one linguistic pattern analytical tool, into a plurality of linguistic pattern strings; (c) matching at least one of the plurality of linguistic pattern strings with at least one stored linguistic pattern string contained within a database; (d) repeating steps (b) and (c) above for each of the at least one linguistic pattern analytical tool; and (e) combining the matches of each of the at least one linguistic pattern analytical tool providing a combined result.

The present invention also provides a system and method for comparing query information about a party against a plurality of restricted parties information contained within a database comprising the steps of: (a) receiving query information about a party; (b) converting the plurality of information about the party into a plurality of party linguistic pattern strings by at least one linguistic pattern analytical tool; (c) matching at least one of the plurality of party linguistic pattern strings with at least one stored linguistic pattern string said plurality of restricted parties information contained within said database; (d) repeating steps (b) and (c) above for each one of the at least one linguistic pattern analytical tool; and (e) combining the linguistic pattern matches of each one of the at least one linguistic pattern analytical tool providing a combined result.

The present invention also provides a method for comparing a query against data contained within a database comprising the steps of: (a) receiving a query containing a plurality of information; (b) converting the plurality of information by an Alphabetic N-gram based linguistic pattern analytical tool into a plurality of Alphabetic linguistic pattern strings; (c) matching at least one of the plurality of Alphabetic linguistic pattern strings with at least one stored linguistic pattern string contained within the database to provide a plurality of Alphabetic matches; (d) converting the plurality of information by a Consonant N-gram based linguistic pattern analytical tool into a plurality of Consonant linguistic pattern strings; (e) matching at least one of the plurality of Consonant linguistic pattern strings with the at least one stored linguistic pattern string contained within the database to provide plurality of Consonant matches; (f) converting the plurality of information by a Numeric N-gram based linguistic pattern analytical tool into a plurality of Numeric linguistic pattern strings; (g) matching at least one of the plurality of Alphabetic linguistic pattern strings with the at least one stored linguistic pattern string contained within the database to provide a plurality of Numeric matches; (h) converting the plurality of information by an Fdi N-gram based linguistic pattern analytical tool, into a plurality of Fdi linguistic pattern strings; (g) matching at least one of the plurality of Fdi Alphabetic linguistic pattern strings with the at least one stored linguistic pattern string contained within the database to provide a plurality of Fdi matches; (h) converting the plurality of information by an Fml N-gram based linguistic pattern analytical tool into a plurality of Fml linguistic pattern strings; (i) matching at least one of the plurality of Fml linguistic pattern strings with the at least one stored linguistic pattern string contained within the database to provide a plurality of Fml matches; and (j) combining the Alphabetic matches, Consonant matches, Numeric matches, Fdi matches, and Fml matches to provide a combined result.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE PREFERRED EMBODIMENT

The following is a functional description of the present invention from an administrative perspective. These functions include starting the present invention in various modes, stopping the present invention, and tuning different parameters that control how the present invention performs a linguistic pattern match.

Figure 1:
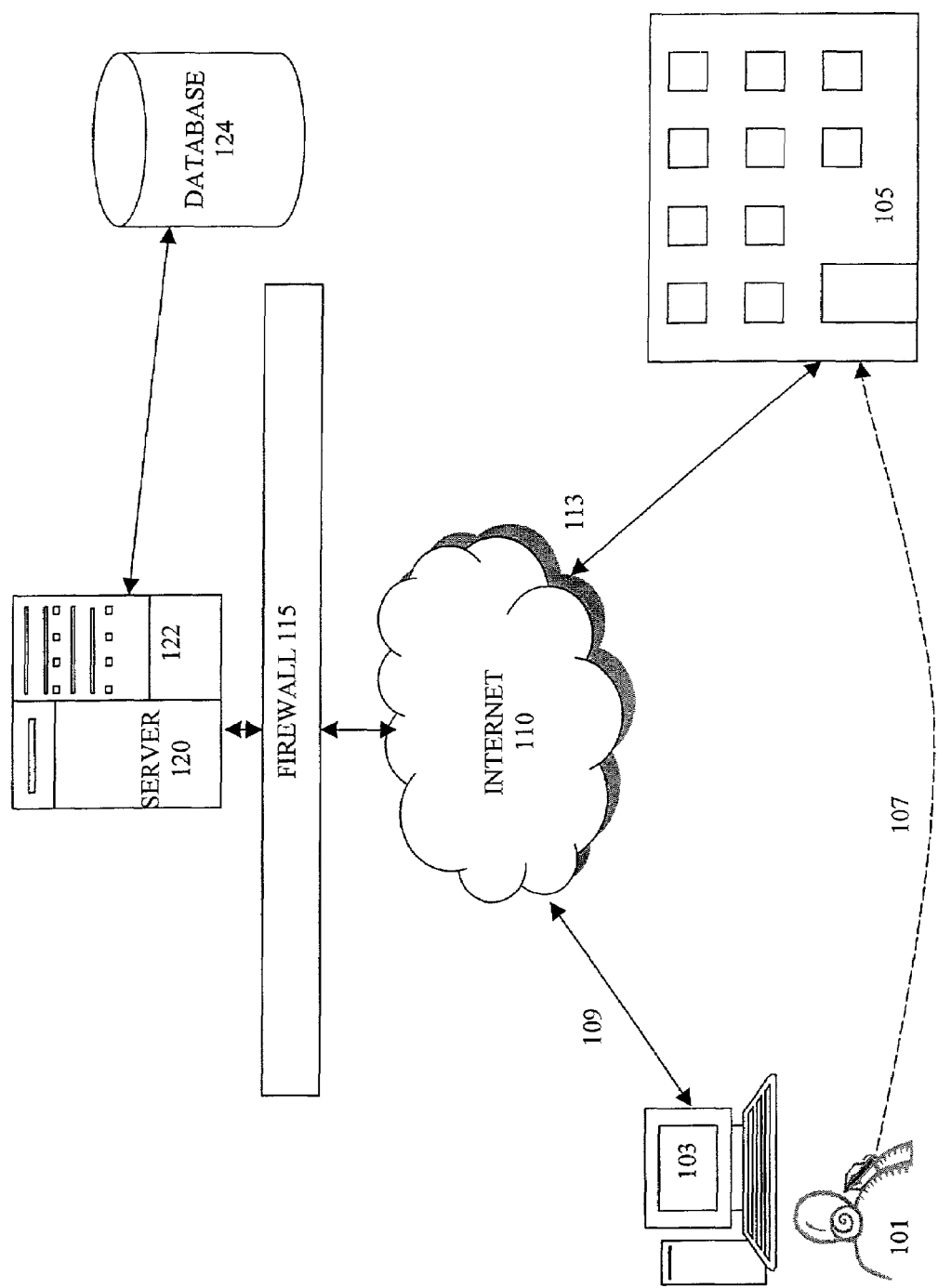
FIG. 1 is a schematic diagram showing an Internet based system for user interaction with a preferred embodiment of the present invention.

In a preferred embodiment of the present invention the user 101 utilizing computer 103 could use the system for restricted party screening. As seen in FIG. 1, the user 101 could be involved in exporting and shipping goods to a receiving party 105. In order for the user 101 to verify that the receiving party 105 is approved for receiving certain goods the user 101 could screen the receiving party 105 against a database 124 containing the names of restricted parties.

Using computer 103, which is connected to the internet 110 via communications path 109, the user accesses the restricted party program 122 on server 120 for screening against the restricted party database 124. A firewall 115 may be incorporated to limit access. The user 101 would input information about the query or receiving party 105, in this example, into computer 103 which is then transmitted through the internet 110 to server 120 and utilized by the restricted party program 122. As will be described in more detail below the restricted party program 122 breaks down the information about the receiving party 105 into various categories and linguistic patterns. The restricted party program 122 then compares the linguistic patterns from the query with the linguistic patterns and categories of parties contained within the restricted party database 124.

By utilizing the preferred embodiment of the present invention the user 101 would be able to determine if the receiving party 105 is contained within the restricted party database 124 with a high level of accuracy so that the user 101 could determine whether to move forward with the transaction and ship goods to the receiving party 105 along path 107. The user 101 can implement the restricted party screening process at different points in the business process. The user 101 could conduct a prescreening of parties it does regular business with, the user 101 can conduct the restricted party screening during the middle of a transaction, or prior to a transaction.

In the prescreening mode the company or the user 101 would have a limited set of business partners or receiving parties 105 which are relatively static. The user 101 would do an initial restricted party screening of all the receiving parties 105 so that the user 101 is comfortable that these receiving parties are not restricted. This allows the user 101 to freely do business with the receiving parties 105 without needing to re-screen them each time they engage in a business transaction. The present invention through the restricted party program 122 is able to monitor information changes about the receiving parties 105 and changes in the restricted party database 124 and automatically re-screen the receiving parties 105. It is necessary to insure that the receiving parties 105 who are not restricted initially have not been added to a restricted parties list therefore the present invention performs an automatic re-screening upon modifications to the receiving party 105 data or the restricted party database 124. Additional applications within the restricted party program 122 allow the present invention to monitor changes to both the restricted party database 124, the receiving parties 105, and the users 101 to automatically invoke a re-screening when required.

The user 101 may also wish to invoke the restricted party screening during a transaction since parties involved within a transaction may vary on a regular basis. As new business partners are introduced on new transactions, there is no way to prescreen the receiving parties 105 before the transactions have started. In this case, the restricted party program 122 and screening process are invoked after the transaction has been created. The restricted party screening would run as part of the compliance screenings required on an export transaction. In addition, the preferred embodiment of the present invention would automatically perform a re-screening if the transaction is modified. The re-screening is necessary to insure that the user 101, the receiving party 105, or other parties involved in the transaction do not circumvent the screening process.

The last method described utilizing the preferred embodiment of the present invention would incorporate the restricted party screening prior to a transaction such that the user 101 would not initiate the transaction until they have confirmed that the receiving party 105 is not on a restricted party list. An example would be an e-commerce business where customers order items or goods over the internet 110. The e-commerce business could verify that the customer or receiving party 105 who desires to order goods is not on a restricted party list within a database 124 prior to allowing the receiving party 105 to actually order items. In this example, the customer or receiving party 105 would be required to enter information via communication path 113. The entered information would be used for verification by the restricted party program 122 that such customer or receiving party 105 is not within a restricted party list contained within the restricted party database 124. Once the customer or receiving party 105 has been screened and not found on any restricted party list the customer of receiving party 105 would be allowed to proceed with ordering items which are then sent from the user 101 along path 107.

The restricted party screening or database screening process of the present invention may be used by itself to determine or assess entered information with that contained within a database or it may be used as part of a broader system such as a landed cost import and export system. The landed cost import and export system could be used to determine locations for shipping goods, calculating the costs for shipping goods to a receiving party, determining taxes or duties for shipping goods to a receiving party, and screening the receiving party against a restricted party list for determination as to whether or not the receiving party is allowed to receive the requested goods.

As will be described in more detail below, the present invention uses linguistic mapping analytical tools and algorithms to filter and find matching records or character strings contained within a database. The linguistic pattern matching and screening process is described in conjunction with FIG. 2. In step 201 the user initiates or starts the screening process. The screening process allows the user of the present invention to determine whether information about a customer, partner, or affiliate matches information of parties contained within a database. This may be useful for determining whether or not the customer, partner, affiliate is a restricted party, a pre-registered user, or the like. The user would enter the query or third party information either prior to step 201 or after initiation of the screening process as seen in step 202.

The user can also select the various sections and options which apply to the screening process in step 203. The user selected sections and options include choices for displaying various matches including known matches, dictionaries, matches, potential matches, and match words which relate to the sections. The user may also select which information is used in determining a match and could include name, address, phone, fax, e-mail and other information. After the sections and options for the screening process are determined the present invention analyzes the information from the third party against data contained within a database.

In step 205, the present invention extracts a set of attributes from the query information, one for each potential match area, such as name, address, city, state, zip, etc. The present invention then tokenizes the information within each attribute in step 207. The extraction and tokenization of these attributes is performed by unique and specialized code as will be described in more detail later. An inspection and examination of each match data record and attribute for unusual characteristics about which the user needs to be notified can be performed, as seen in step 209. The unusual words dictionary, as will be described in more detail below, is used by the present invention for this purpose.

To find potential matches a pre-screening, step 211, of the extracted and tokenized attributes of the query are matched against tokenized attributes of the saved records contained within a database. The various linguistic mapping tools, clarifiers, and algorithms which may be incorporated in the pre-screening 211 at least include: Metaphone 213, Phonex 215, Soundex 217, Alphabetic N-gram 219, Consonant N-gram 221, Numeric N-gram 223, Fdi N-gram 225, and Fml N-gram 227. The analysis by the various linguistic pattern matching tools 205-229 may be performed sequentially or simultaneously. In the example shown in FIG. 2 the process or screenings are done sequentially. The pre-screening 211 is generally very broad in nature attempting to find all possible matches of all attributes and provides a Broad Subset of Potential Attribute Matches as seen in step 229.

Each potential match within the Broad Subset of Potential Matches 229 is then analyzed by the detail matching process of step 231. In the detail matching process 231, for each potential match, the number and type of word matches may be determined by using Metaphone 233, Phonex 235, Soundex 237, Edit Distance 239, and the various Dictionaries 241 which are all used to determine how many words match exactly and approximately. The information in all of the Dictionaries 241 is used in performing these word matches. This includes the common words, distinct words, etc. It does not include the unusual words dictionary although such could be incorporated and still be within the scope of the present invention. That information is used by specialized algorithms, unique to each type of attribute, to determine if a potential match is an actual match. For name matching there can also be an additional algorithmic step to determine if the initials match.

All matches found by the various pre-screening 211 and detail matching 231 linguistic pattern matching tools are still categorized by each attribute (names, address, phone etc. for this example). In step 250 all of the records with individual attribute matches are combined. In step 260 the combined set of matches are filtered to remove undesirable matches in accordance with the selections established in step 203. In a preferred embodiment the primary application uses "negative" matches on location to filter undesirable matches. The present invention can employ various methods to include false negative matches and to limit false positives. Ultimately, the results are displayed in step 265 and the matching process is terminated in step 270.

The present invention uniquely combines the elements, linguistic pattern matching analytical tools, and results of each analysis. Further, the particular ways in which the present invention tokenizes words, extracts attributes, and uses the various dictionaries is unique. Further, the particular dictionaries used, the filtering and negative matching, and the particular data formats and commands used for socket communication and for XML socket communication are unique. The manner in which these various features are parameterized is also unique. In a preferred embodiment the focus is on reducing the number of false negatives with a minimal impact possible on the number of false positives.

For installation of the preferred embodiment of the present invention, the operating system resources could include 1 to 3 megabytes of hard disk storage for the program and data files. An allocation of 5 or more megabytes should provide a safe reserve for installing the present invention. If the present invention is to be used as a TCP/IP socket server, then TCP/IP sockets must be available. If the present invention is to be used as a SAP server, then SAP must be available, and a version of the present invention which provides the SAP interface must be installed. The SAP interface is currently only available for Windows NT 4.0 and HP_UX 10.2. All versions of the present invention support a socket client/server interface.

When executing, the present invention may require internal memory of approximately 15 times data file size, plus the size of the executable program. In practice, this is around 12 megabytes if only Restricted Party Matching is to be used, and 20 megabytes if both Restricted Party Matching and Partner Matching are to be used. In Restricted Party Matching mode, the present invention attempts to determine if a particular entity exists in the Restricted Party List. In Partner Matching, the present invention attempts to determine if a known Restricted Party exists in company's list of business partners.

To properly install the present invention, several files may be required. A description of key files follows, as well as a description of many of the functions controlled by those files. Although specific file names, file locations, function names, parameter names, and the like are given it is understood that such names and locations may be changed without departing from the scope or spirit of this application.

Denper is the primary application, or executable file and currently ranges in size from 300 kB or Windows NT to around 2 MB on Unix. Denper.ini is a configuration file which may affect the operation of the primary application. Denper.ini contains various options used during testing and evaluation, as well as data file names, their associated configuration files, and other such information. Denper.ini and other configuration files described herein may be text files or other user-editable file types, and may be organized in a manner similar to standard Windows .ini files.

As with standard Windows .ini files, blank lines are ignored, leading white space on a line is ignored and everything that follows a # (number sign) is ignored when denper.ini or other configuration files are processed by the present invention. Remaining lines may be treated as section headers or content lines. Section header lines may take the format [section] or [attribute.section]. Content line format is dependent upon the containing section. Content lines need not be in a specific order within a section. In addition, except for the [end] section, section order within a configuration file is not significant. However, an [end] section must be the last section in the .ini file, as an [end] section indicates the end of the configuration file.

The denper.ini configuration file may consist of two or more sections, including [options] and [end]. The [options] section contains a series of key/value pairs. For options which may be enabled or disabled, the value portion of a key/value pair associated with that option may be "true" or "false," respectively. Such key/value pairs supported by the [options] section include:
　　displayKnownMatches=true/false
　　displayDictionaries=true/false
　　displayMatches=true/false
　　displayPotentialMatches=true/false
　　displayMatchWords=true/false These key/value pairs may be used for testing during algorithm development. In a preferred embodiment, all values should be set to "false" when the present invention is used in production.

In addition the to true/false options, the present invention may also support customizable options. Such options include:
　　partnerListTuning=partner.ini
　　partnerListName=partner.bin
　　restrictedPartyListTuning=restrict.ini
　　restrictedPartyListName=restrict.bin The key/value pairs listed above may specify the partner list configuration and data files, and the restricted party list configuration and data files. Default values used in a preferred embodiment are shown above; however, other file names and paths may be used.

In a preferred embodiment, if only restricted party matching is required, the partner.bin file may be zero bytes in length. Alternatively, if only partner matching is desired, the restrict.bin file may be zero bytes in length.

Partner.ini is a configuration file which affects Partner Matching. This file may be required even when Partner Matching is not used. Partner.ini may be a text file or other user-editable file type. Partner.ini may contain key/value pairs similar to those of restrict.ini, which are outlined below.

Partner.bin is a data file used for Partner Matching. This file may be required even when Partner Matching is not used, but may be zero length. This is a binary file which may not be easily edited by a user.

Restrict.ini is a configuration file which affects Restricted Party Matching which may include, but is not limited to, the following sections:
　　[options]
　　[name.indexTuning]
　　[name.matchTuning]
　　[name.commonWords]
　　[name.distinctWords]
　　[name.unusualWords]
　　[name.synonyms]
　　[name.wordFragments]
　　[address.matchTuning]
　　[address.commonWords]
　　[address.distinctWords]
　　[address.unusualWords]
　　[address.synonyms]
　　[phone.indexTuning]
　　[phone.matchTuning]
　　[fax.indexTuning]
　　[fax.matchTuning]
　　[E-mail.indexTuning]
　　[E-mail.matchTuning]
　　[end]

The [options] section contains a series of key/value pairs, including:
　　matchName=true/false
　　matchAddress=true/false
　　matchPhone=true/false
　　matchFax=true/false
　　matchE-mail=true/false Such key/value pairs may enable or disable matching for each supported matching method.

The [name.indexTuning] section contains a series of key/value pairs, including:
　　indexByMetaphone=true/false
　　indexByPhonex=true/false
　　indexBySoundex=true/false
　　indexByAlphabeticNgram=true/false
　　indexByConsonantNgram=true/false indexByNumericNgram=true/false
indexByFdiNgram=true/false
indexByFmlNgram=true/false These key/value pairs may enable or disable individual indexing types used by the matching algorithm. As the number of indexes used increases, the likelihood of finding potential word matches also increases. However, as the number of indexes used increases, storage space and processing time required by the matching algorithm also increases.

The first three keywords—'indexByMetaphone', 'indexByPhonex', and 'indexBySoundex'—use phonetic word indexing methods similar to those in the prior art. These work well for names containing Arabic (i.e. English) characters, but do not work well for non-Arabic based names.

Other keywords may use N-grams for word indexing. An N-gram is a subsequence of N characters from the full word. There are several different ways to select the set of particular subsequences to be used for indexing.

Figure 2:
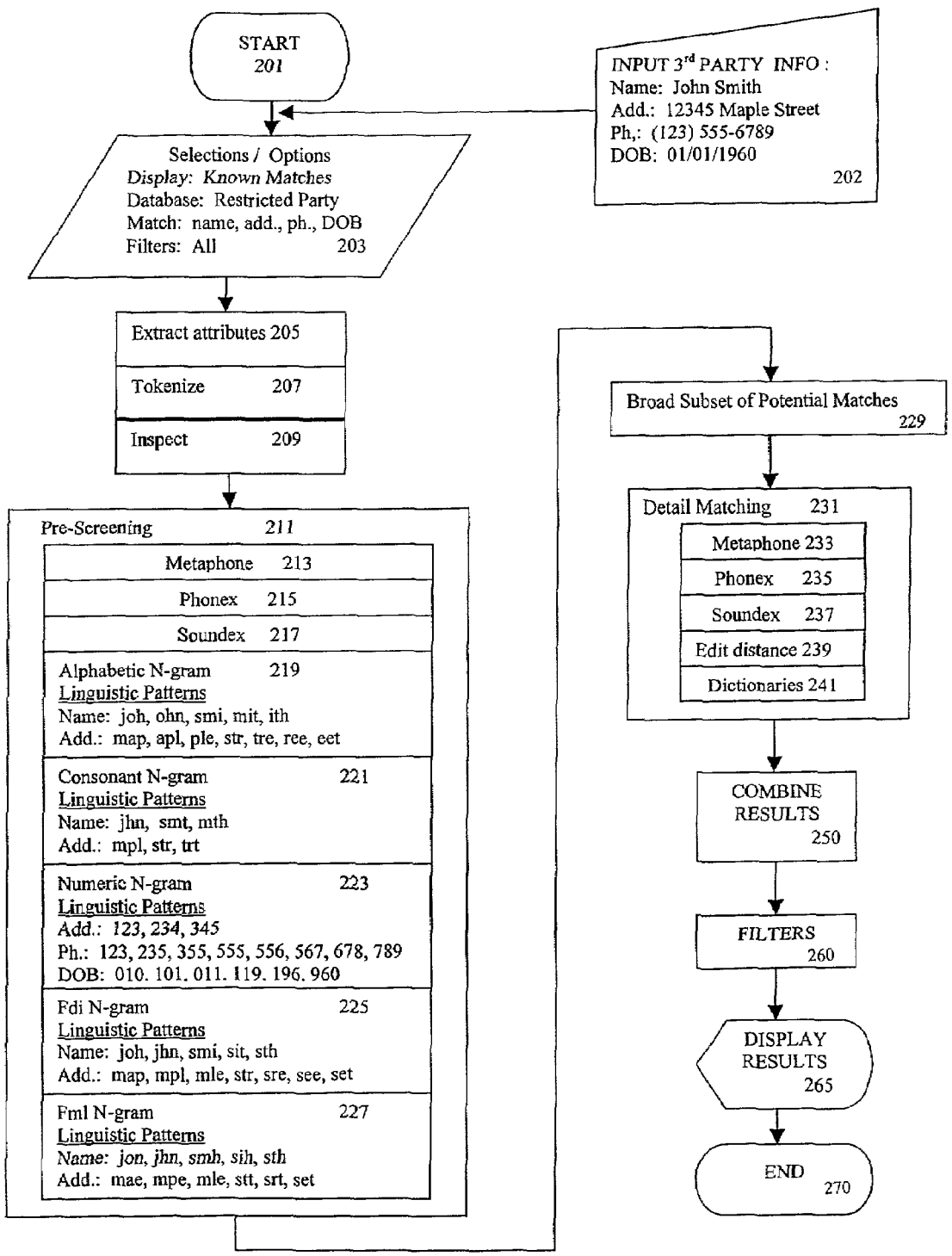
FIG. 2 is a schematic diagram illustrating the flow or steps of linguistic pattern matching of the present invention.

An Alphabetic N-gram 211 chooses all possible contiguous subsequences of length N where the characters are alphabetic. A consonant N-gram 213 chooses all possible contiguous subsequences of length N where the characters are consonants, with duplicate successive characters and non-consonants deleted. A numeric N-gram 215 chooses all possible contiguous subsequences of length N where the characters are digits with all non-digits deleted. An fdi N-gram 217 chooses subsequences in which the first character of the word is always the first alphabetic character of the N-gram, and the remaining characters of the N-gram are all possible alphabetic subsequences of (N-1) contiguous characters from the word. An fml N-gram 219 generates N-grams in which the first and last alphabetic characters of the N-gram are the same as the first and last characters of the word. The middle characters are all possible subsequences of (N-2) contiguous alphabetic characters from the word. The example contained within FIG. 2 shows the indexing techniques or linguistic patterns for each one of the N-gram linguistic pattern analytical matching tool 211, 213, 215, 217, 219. Additional examples of these indexing techniques, where N=3, include:

indexByAlphabeticNgram
helloworld—hel, ell, llo, low, owo, wor, orl, rld
indexByConsonantNgram
helloworld—hlw, lwr, wrl, rld
indexByNumericNgram
6619006—661, 619, 190, 900, 006
indexByFdiNgram
helloworld—hel, hll, hlo, how, hwo, hor, hrl, hld
indexByFmlNgram
helloworld—hed, hld, hod, hwd, hrd (note that duplicate indices are discarded)

In addition to the indexing techniques described above, the [name.indexTuning] section may also allow a user to customize certain index properties by changing values in key/value pairs. Examples of such key/value pairs include:
metaphoneLength=#
phonexLength=#
soundexLength=#
alphabeticNgramLength=#
consonantNgramLength=#
fdiNgramLength=#
fmlNgramLength=#
numericNgramLength=#

Such key/value pairs may set the number of characters used by each of index. In a preferred embodiment, values smaller than the default may result in more comprehensive indexing, but may also result in too many matches to be useful. Values larger than the default result in poorer indexing. The default values for the key/value pairs listed above are:
metaphoneLength=4
phonexLength=4
soundexLength=4
alphabeticNgramLength=3
consonantNgramLength=3
fdiNgramLength=3
fmlNgramLength=3
numericNgramLength=3

The [name.matchTuning] section contains a series of key/value pairs, which include:
matchByMetaphone=true/false
matchByPhonex=true/false
matchBySoundex=true/false
matchByEditDistance=true/false
matchBySet=true/false These key/value pairs may enable or disable various word matching techniques. Generally, the most effective technique is the 'matchByEditDistance'. The edit distance is the number of characters which have to be inserted, deleted, changed or transposed in one word to obtain the second word. For example, the edit distance between 'Michael' and 'Mikhail' is 2 (replace 'c' by 'k' and 'e' by 'i'). Matching by any of the phonetic based methods (such as Soundex) would fail if the 'c' and 'k' were not considered to be phonetically equivalent. Although phonetic based methods may work for names of English origin, non-English names are not well matched by such methods.

The [name.matchTuning] section may also contain key/value pairs which allow a user to customize word matching thresholds, including:
isWordMatchThresholdDynamic=true/false
wordMatchThreshold=#

If 'isWordMatchThresholdDynamic' is true then 'wordMatchThreshold' is ignored. If 'isWordMatchThresholdDynamic' is false, then the value associated with 'wordMatchThreshold' becomes the minimum number of words which must match for the search and comparison strings to be considered a match. The dynamic option increases the number of required word matches as the number of words in a search string increases. The dynamic option also allows imperfect matches to be considered.

The [name.matchTuning] section may further allow word match sensitivity to be customized through key/value pairs such as:
isWordMatchSensitivityDynamic=true/false
wordMatchSensitivity=#

If 'isWordMatchSensitivityDynamic' is true then 'wordMatchSensitivity' is ignored. If 'isWordMatchSensitivityDynamic' is false, then 'wordMatchSensitivity' is the maximum edit distance between words allowed for the words to be considered a 'match'. Values smaller than 2 allow only very minor variations in word spelling for a match, while values larger than 2 generally match too many words to be used. The dynamic option increases the allowed edit distance based on the length of words being matched. Thus, small edit distance thresholds are used for short words and larger edit distance thresholds are used for longer words. The dynamic option generally provides an optimum choice for matching words.

The [name.matchTuning] section may also contain wordPrefixDifferencePenalty=#, a key/value pair which specifies a penalty to be added when the first character in each compared word differs. This penalty may be desirable because words which are recognizable variants typically start with the same letter, and because typically the first letter of a word is entered correctly, even when the word is misspelled. In a preferred embodiment, this penalty may be set to 3.

The [name.matchTuning] section may also allow set match sensitivity to be customized through key/value pairs such as:
   isSetMatchSensitivityDynamic=true/false
   setMatchSensitivity=#

These values are similar to those used for word matching, but may apply to sets of words. When applied to sets, sensitivity may be calculated as an average allowed per word (i.e. as the number of words increases, more differences may be allowed).

The [name.commonWords] section contains a common words dictionary, which lists words occurring so frequently as to be essentially meaningless. Words in this section may be ignored by the matching process. Each line in this section may take the format:
   word, word, word, . . . , word
   for example:
   0, 1, 2, 3, 4, 5, 6, 7, 8, 9
   a, b, c, d, e, f, g, h, i, j, k, l, m
   n, o, p, q, r, s, t, u, v, w, x, y, z
   and, or, of, the
   associates, group
   company The [name.distinctWords] section contains a distinct words dictionary and lists pairs of words which the matching algorithm normally considers to match, but which client experience has found are not matches. Each line is this section has the format:
   word, word
   for example:
   america africa
   holding holiday
   marine machine
   sea sky
which have an edit distance, respectively, of 2, 3, 2 and 2. The matching algorithm may consider these words to be the same, but a closer examination of these matches would suggest that they are rarely misspelled.

The [name.unusualWords] section contains an unusual words dictionary and lists words which are sufficiently unique that they cause any match candidate that contains an unusual word to match. Each line in this section has the format:
   word
   for example:
   Saddam The [name.synonyms] section contains a synonym dictionary, which lists words that are considered to match even though the matching process would not normally consider the words to match. Each line in this section has the format:
   word, word, . . . , word->word
where each of the words to the left of the arrow will be replaced by the word on the right of the arrow before matching. This section can also be used to correct known misspellings and to handle nicknames are name variants. For example:
   bill->william
   dr->doctor
   h0ldings->holdings
   industria, industrie->industry
   iraqi, iraquiano->iraqu
   irrrran, iranische->iran
   mike->michael
   rob, bob, bobby->robert
   oil, petrol->petroleum The [name.wordFragments] section contains a word fragments dictionary, which is a description of words that are likely to be fragmented. The selection of these word fragments may be based on client experience, database contents, and other factors. Each line in this section may take form:
   fragment, fragment, . . . , fragment->word
   for example:
   al-khalij, al-arabi->al-khalij-al-arabi
   gold, star->goldstar
   import, export->export-import
   import, export->import-export
   import, export->importexport These examples show that the same word fragments can be combined in different ways, thereby allowing hyphenated names to be matched. Normally, word ordering is not significant in the matching process. However, when a word is hyphenated, word order becomes significant; therefore, it is sometimes desirable to list the hyphenated word in all expected word orderings.

The [address.matchTuning] section contains a series of key/value pairs, which include:
   matchByMetaphone=true/false
   matchByPhonex=true/false
   matchBySoundex=true/false
   matchByEditDistance=true/false
   matchBySet=true/false These key/value pairs may control how addresses are matched. The address matching algorithm may function similar to the previously described word matching algorithm.

The [address.matchTuning] section also contains key/value pairs which control match thresholds, including:
   isAddressMatchThresholdDynamic=true/false
   addressMatchThreshold=#

These key/value pairs set the threshold for the number of words which must match for two attributes to match. If 'isAddressMatchThresholdDynamic' is true then 'addressMatchThreshold' may be ignored. If 'isAddressMatchThresholdDynamic' is false, then 'addressMatchThreshold' is the minimum number of words which must match for the compared words to match. The dynamic option increases the number of required exact word matches as address length increases, and also allows imperfect matches to be considered.

Also included in the [address.matchTuning] section are key/value pairs which control address match sensitivity when using the Edit Distance comparison method, such as:
   isAddressMatchSensitivityDynamic=true/false
   addressMatchSensitivity=#

If 'isAddressMatchSensitivityDynamic' is true then 'addressMatchSensitivity' may be ignored. If 'isAddressMatchSensitivityDynamic' is false, then 'addressMatchSensitivity' is the maximum edit distance between addresses allowed for the addresses to be considered a 'match'. Values smaller than 2 allow only minor variations in address spelling for a match, while values larger than 2 may match too many addresses to be useful. The dynamic option increases the allowed edit distance based on the length of addresses being matched. Thus, the dynamic option uses small edit distance thresholds when comparing short addresses, and larger edit distance thresholds for longer addresses.

The [address.matchTuning] section also contains a key/value pair, addressPrefixDifferencePenalty=#, which is a penalty added when the first characters differ between compared words, as with the previously described wordPrefixDifferencePenalty.

The [address.matchTuning] section may further contain a series of key/value pairs controlling match sensitivity, including:

isSetMatchSensitivityDynamic=true/false
    setMatchSensitivity=#

These key/value pairs function similar to those for word set matching, but may be applied to address set matching.

The [address.commonWords] section contains a common words dictionary which may lists words which frequently occur but, for comparison purposes, are essentially meaningless. Words in this section may be ignored by the matching process. The [address.commonWords] section may contain data of a structure similar to [name.commonWords], and may serve a similar purpose when evaluating addresses.

The [address.distinctWords] section contains a distinct words dictionary, which lists pairs of words that the matching algorithm normally considers as matching, but which client experience has found are not matches. The [address.distinctWords] section may contain data of a structure similar to [name.distinctWords], and may serve a similar purpose when evaluating addresses.

The [address.unusualWords] section contains an unusual words dictionary, which lists words that are sufficiently unique that any address match candidate containing an unusual word should be considered a match. The [address.unusualWords] section may contain data of a structure similar to [name.unusualWords], and may serve a similar purpose when evaluating addresses.

The [address.synonyms] section contains a synonym dictionary, which lists words that are considered to match even though the matching process would not normally consider the words to match. Each line in this section has the format:

word, word, . . . , word->word where each of the words to the left of the arrow will be replaced by the word on the right of the arrow before matching. This section can also be used to correct known misspellings and to handle nicknames are name variants. Examples of such synonyms include:

av, ave->avenue
    st->street
    first->1st
    second->2nd
    third->3rd
    fourth->4th
    fifth->5th
    sixth->6th
    seventh->7th
    w.->west
    e.->east
    n.->north
    s.->south
    ste->suite
    rd->road
    dr->drive
    no, no.->number
    bldg->building The [phone.indexTuning] section contains a series of key/value pairs which control phone number matching. Such key/value pairs include:

indexByNumericNgram=true/false

The index is used to find phone numbers during the matching process. An N-gram is a subsequence of N characters from the full word.

A numeric N-gram chooses all possible contiguous subsequences of length N where the characters are digits with all non-digits deleted. By way of an example, without intending to limit the present invention, the number 6619006 may be converted to N-grams of 661, 619, 190, 900, and 006, when N=3.

The [phone.indexTuning] section also contains numericNgramLength=#, a key/value pair which sets the number of digits used for numeric N-Grams. The default value is 3.

The [phone.matchTuning] section contains a series of key/value pairs which control matching of telephone numbers, including:

matchByEditDistance=true/false

Generally, the only effective phone number matching technique is 'matchByEditDistance'. The edit distance is the number of digits which have to be inserted, deleted, changed or transposed in one phone number to obtain the second phone number.

The [phone.matchTuning] section also includes key/value pairs such as:

isPhoneMatchSensitivityDynamic=true/false
    phoneMatchSensitivity=#

These key/value pairs set the sensitivity for phone number matching using the edit distance. If 'isPhoneMatchSensitivityDynamic' is false, then 'phoneMatchSensitivity' is the maximum edit distance between phone numbers allowed for the phone numbers to be considered to 'match'. Values smaller than 2 allow only very minor variations in phone numbers for a match, while values larger than 2 generally match too many phone numbers to be useful.

The [fax.indexTuning] section contains a series of key/value pairs which are similar to those in the [phone.matchTuning] section.

The [E-mail.indexTuning] section contains a series of key/value pairs which control the indexing of E-mail addresses, including:

indexByAlphabeticNgram=true/false
    indexByConsonantNgram=true/false
    indexByNumericNgram=true/false An index may be used to find E-mail addresses during the matching process. As the number of indexing methods is increased, the number of potential matches may increase. However, as more E-mail indexing methods are used, the matching algorithm may require more space and processing time.

The key/value pairs of the [E-mail.indexTuning] section may use N-Grams for E-mail address indexing. N-gram indexing is described in detail above.

The [E-mail.matchTuning] section may contain a series of key/value pairs, including:

matchByEditDistance=true/false
    isEmailMatchSensitivityDynamic=true/false
    emailMatchSensitivity=#

These key/value pairs control E-mail address matching. Generally, the only effective technique is 'matchByEditDistance'. The edit distance is the number of characters which have to be inserted, deleted, changed or transposed in one E-mail address to obtain the second E-mail address.

The [email.matchTuning] key/value pairs control E-mail address edit distance matching, and set the sensitivity for edit distance E-mail address matching. If 'isEmailMatchSensitivityDynamic' is false, then 'wordMatchSensitivity' is the maximum edit distance between fax numbers allowed for the E-mail address to be considered to 'match'. Values smaller than 2 allow only very minor variations in E-mail addresses for a match, while values larger than 2 generally match too many E-mail addresses to be used.

The [end] section indicates the end of the configuration file. No data follows this section.

Restrict.bin is a data file used for Restricted Party Matching and may be used even when Restricted Party Matching is not used, but may be zero length. This is a binary file not intended to be edited by the user.

In a preferred embodiment of the present invention, the files listed above and containing the parameters outlined above could be installed in the same directory. It is further preferred that the present invention not share a directory with other applications. When using a socket server, data files may be reloaded or replaced. Any such replacements could be placed in the same directory as the other files.

Once installed, the present invention may be executed from a command line with a command such as "denper -r -h", which will start the present invention as a socket server using default options. Command line options supported by the present invention include:

| | | |
|---|---|---|
| -? | | Display command line help |
| -a | addressAddress | of socket server host, default: "localhost:20787" |
| -a | nnnn | Socket server port, defaults to 20787 |
| -b | | Basic match - - - ignore dictionaries |
| -c | options | Name of configuration file, defaults to "the present invention.ini" |
| -d | restrictedList | Name of file containing restricted party list |
| -f | | Fixed length fields in restricted party records |
| -h | | Host socket interface (only -a, -c, -d, -f, -t and -v options may be used with -h) |
| -i | inputFile | Name of input file for batch and update modes |
| -l | newList | Name of new list |
| -lf | newList | Name of new text list |
| -lv | newList | Name of new binary list |
| -n | "name" | Name to be matched |
| -o | outputFile | Name of output file for batch and update modes |
| -r | | Match complete record |
| -t | | Trace |
| -v | | Variable length fields in binary restricted party records |
| -x | | Client socket interface |
| -P | | Dump partner list |
| -R | | Dump restricted party list |
| -U | | Update restricted party list |
| -X | | Display performance information |

The following are sample commands which may be used to start the present invention, as well as brief descriptions of some of the functionality gained by using a command line option. For example, a command of "denper -a nnnn -h", may start the present invention as a socket server listening on port nnnnn.

A further example is the command "denper -a host:nnnn -r -x -i matchData.txt -o results.txt", which may start the present invention as a socket client in batch mode, where the present invention is running as a socket server on host and listening on port nnnnn. In addition, the previously illustrated command line may use complete record matching, as indicated by option -r. Batch mode, indicated by the -r option, allows the present invention to read comparison data from the file specified as "matchData.txt;" the match results may be written to the file specified as "results.txt." By default, when the -i and -o options are omitted, the present invention may use "stdin" and "stdout" for input and output, respectively.

A command line of "denper -s" may start the present invention as a SAP server.

A command line of "denper -r -i matchData.txt -o results.txt" may start the present invention in batch mode. Complete record matching will be used (this is indicated by the -r option and is normally used when running the present invention in batch mode). Match data may be stored in the file specified as "matchData.txt," and match results may be written to the file specified as "results.txt." By default, when the -i and -o options are omitted, the present invention uses "stdin" and "stdout" for input and output, respectively.

A command line of "denper -n 'name to match'" may start the present invention and attempt to match a single name. The results may be written to "stdout."

A command line of "denper -a host:nnnn -x -n 'name to match'" may start the present invention as a socket client and attempt to match a single name. The results may be written to "stdout", or redirected to a file by adding a -o option.

In addition to command line options and configuration files, the present invention may also receive input from environment variables or other such inter-process communications methods. For example, the present invention may read the environment variable EMS_DENPER. EMS_DENPER may contain a port number, when the present invention is used as a socket server, or a host name and port number when the present invention is used as a socket client.

If EMS_DENPER is not present, the -a command line option may be used for the same purpose. By way of example, without intending to limit the present invention, if the EMS_DENPER environment variable is not present, the present invention may be started using a command line similar to "denper -a nnnnn -h", where nnnnn is the socket port to be used. If no socket port is given, the present invention may provide a default for the socket port such as 20787.

Once started, no explicit action may be necessary to stop the present invention. When running as a socket or SAP server, the present invention may be stopped by killing it as a process using appropriate system commands, such as control-c under Windows NT. Since the present invention is not intended to write files when used as a socket or SAP server, killing the present invention as a process should not cause data loss. When the present invention is used in batch mode from the command line, it may terminate after processing an input file, or when an empty match data line is received.

The preceding has described the present invention from a user perspective. Within a preferred embodiment, the present invention may store data in one or more record types. Such record types may include, but are not limited to, Address, BillingData, CountryMatchData, CountryRecord, PartnerKey, PartnerMatchData, PartnerRecord, PlaceNameKey, RestrictedPartyKey, RestrictedPartyMatchData, RestrictedPartyRecord, StateMatchData and StateRecord. Each record type may be converted from and into multiple formats, including, but not limited to, display-oriented, comma separated variables, variable length binaries, fixed-length text, and XML records.

Records may be nested within other records, and each component of such nested record may be converted from one record type to another by recursively requesting conversion of each nested component. In a preferred embodiment, record conversion procedures may be distributed throughout the source code to those portions of the source code requiring such information. This distributed architecture allows conversion information to not be limited to a single location within the source code.

From a high level perspective, a preferred embodiment may implement a data flow similar to that outlined below:

A request may be received by a socket or other network interface method, and may be decoded, parsed, or otherwise processed. Components of the present invention or other, external applications, such as those tied to accounting, product registration, or other tools, may be queried before a request is allowed.

A new RestrictedPartyMatchData record may be created and may load itself from a match request.

RestrictedPartyMatcher may be asked for notifications triggered by RestrictedPartyMatchData and/or for all RestrictedPartyRecords matching RestrictedPartyMatchData.

Each matched RestrictedPartyRecord may be converted into a network interface-appropriate form, and a RestrictedPartyMatcher response is returned, via a socket interface, to a requestor.

Before describing the process flow triggered by a RestrictedPartyMatchData or RestrictedPartyRecord record when requesting notifications from a RestrictedPartyMatcher, a brief description of some core concepts will be undertaken. The first concept is that of a Mapper. A Mapper is an object which converts another object into an array of one or more strings. By way of an example, without intending to limit the present invention, a Mapper may be used in a preferred embodiment to extract match data and record features, tokenize strings, and extract string indices.

When an inspection or match request is made, match data may be passed to an appropriate Mapper, which can return an array of strings representing match data features. Each string returned by a Mapper may have a meaning associated with it by a Mapper. When an attempt is made to match against a particular record, a record may be passed to an appropriate Mapper which returns an array of strings representing record features.

The number of strings and meaning of each string is identical to a string array returned for corresponding match data. In a preferred embodiment, the present invention may implement a plurality of unique feature Mappers, including: AddressFeatures, CountryMatchDataFeatures, CountryRecordFeatures, PartnerMatchDataFeatures, PartnerRecordFeatures, RestrictedPartyMatchDataFeatures, RestrictedPartyRecordFeatures, StateMatchDataFeatures and StateRecordFeatures.

Also used within the present invention are Tokenizers, which are similar to Mappers. Like a Mapper, a Tokenizer may convert a string into an array of strings. Once a Mapper has extracted a feature from a record, that feature can be tokenized by passing it to an appropriate Tokenizer, which returns an array of strings representing the feature. In a preferred embodiment, inspections and matches may be performed against tokenized features. A plurality of Tokenizers may be implemented within the present invention, including: AddressTokenizer, EmailTokenizer, FaxTokenizer, NameTokenizer, PhoneTokenizer, PlaceNameTokenizer, PostalTokenizer and WebTokenizer.

Another core concept implemented in the present invention is a Classifier. A Classifier, like a Tokenizer, can convert a string into an array of strings. However, while a Tokenizer extracts "tokens" or "words" from a string, a Classifier extracts indices from a string, such strings typically representing a token. A plurality of Classifiers may be implemented in a preferred embodiment, including: AlphabeticNgramClassifier, ConsonantNgramClassifier, FdiNgramClassifier, FmlNgramClassifier, MetaphoneClassifier, NumericNgramClassifier, PhonexClassifier and SoundexClassifier.

Another core concept to the present invention is that of a Matcher. A Matcher is an object which, when presented with an object, may return a set of notification strings or a set of matched objects. There are two primary types of Matchers, record Matchers and feature Matchers. Record Matchers are passed match data and may return a set of notification strings or a set of matched records. Feature Matchers are passed feature strings (extracted from match data or records using feature Mappers) and may return notification strings or sets of matched feature strings.

A plurality of record Matchers may be implemented in a preferred embodiment, including: CountryMatcher, PartnerMatcher, RestrictedPartyMatcher and StateMatcher. In addition, a plurality of feature Matchers may also be implemented in a preferred embodiment, including: AddressMatcher, EmailMatcher, FaxMatcher, NameMatcher, PhoneMatcher, PlaceNameMatcher, PostalMatcher and WebMatcher.

A preferred embodiment of the present invention may also include additional Matcher types, such as SmarteClientMatcher and SocketClientMatcher. Such Matchers present an interface similar to that of a record Matcher, but can communicate a request across a socket to a server, such server directing request to an appropriate Matcher functioning within that server. These Matchers may be templates which have been parameterized to allow their use without knowledge of an actual Matcher servicing match requests, or even knowledge of match data or records. This is an example of one of the many places that the ability of a record to convert itself between different formats comes into play.

With the previous definitions in mind, the manner in which a RestrictedPartyMatcher functions can be discussed. When either an inspection request or a match request is made, a RestrictedPartyMatchData record may be passed to a RestrictedPartyMatchDataFeatures instance, which may extract features from match data. In a presently preferred embodiment, such extracted features may include: name, address, phone, fax, email and web.

An AddressFeatures instance may be used to extract address features since an address is a nested component of a RestrictedPartyMatchData record. Once the features have been extracted, AddressMatcher, NameMatcher, PhoneMatcher, FaxMatcher, EmailMatcher and WebMatcher instances can be called to satisfy an inspection or match request. Results from individual matchers may be combined into a single result set. For match requests, results may be "filtered" to remove RestrictedPartyRecord records not satisfying the filters. Examples of such filters include, but are not limited to, date and issuing country.

Each of these steps can be influenced by various options in an initialization file, as described above. For example, an initialization file may indicate which indices are extracted, how such features are extracted, inspection or matching techniques to be used, and which filters should be applied to match results.

Through the system and method described above, the present invention may facilitate linguistic pattern matching by providing new means for string comparison. The present invention further adds the ability to compare non-Arabic strings, and the present invention allows such comparisons to be performed on a distributed basis.

While the preferred embodiment and various alternative embodiments of the invention have been disclosed and described in detail herein, it may be apparent to those skilled in the art that various changes in form and detail may be made therein without departing from the spirit and scope thereof.

The invention claimed is:

1. A system for comparing a query against data contained within at least one database comprising:
   (a) a central processing unit having at least one electronic communications port for receiving said query, wherein said central processing unit is attached to said at least one database and said query includes a party's name;
   (b) at least one extraction tool accessible to said central processing unit for extracting a plurality of attributes from a plurality of user selectable match areas from said query;
   (c) at least one linguistic pattern analytical tool having characteristics at least some of which are user selectable and being accessible to said central processing unit for converting said plurality of attributes from said query into a plurality of linguistic pattern strings, and for comparing, using at least one user selectable index property, said plurality of linguistic pattern strings with at least one stored linguistic pattern string from at least one stored attribute contained within said at least one database for providing a set of matches;
   (d) said at least one linguistic pattern analytical tool accessible to said central processing unit for analyzing said set of matches to provide at least one set of matched attributes;
   (e) at least one combining tool accessible to said central processing unit for combining all of said at least one set of matched attributes to provide a combined result;
   (f) at least one monitoring tool for monitoring information about said party;
   (g) at least one monitoring tool for monitoring information in said database;
   (h) wherein, responsive to any change to said party's information, the system automatically rescreens said party for determining whether said party is approved for receiving certain goods; and
   (i) wherein, responsive to any change to said database information, the system automatically rescreens said party for determining whether said party is approved for receiving certain goods; and
   (j) wherein said at least one database includes names of parties restricted from receiving certain goods.

2. The system of claim 1, further comprising at least one filtering tool accessible to said central processing unit for filtering said combined result according to at least one user selectable criteria.

3. The system of claim 1, wherein said at least one linguistic pattern analytical tool is comprised of at least one of a Metaphone based analysis, a Phonex based analysis, a Soundex based analysis, an N-gram based analysis, an edit-distance based analysis and a dictionaries based analysis.

4. A computer program product for querying a database comprising a computer useable medium having a computer readable program code-executable on a computer system for performing the operations of:
   (a) receiving a query;
      wherein said query includes a party's name;
   (b) extracting a plurality of attributes from a plurality of user selectable match areas from said query;
   (c) providing at least one linguistic pattern analytical tool having characteristics at least some of which are user selectable for converting information of a plurality of attributes from said query into a plurality of linguistic pattern strings;
   (d) comparing, with at least one user selectable index property, said plurality of linguistic pattern strings with at least one stored linguistic pattern string from at least one stored attribute contained within said database to provide a set of matches;
   (e) analyzing said set of matches, using said at least one linguistic pattern analytical tool, to provide at least one set of matched attributes;
   (f) combining all of said at least one set of matched attributes to provide a combined result;
   (g) monitoring information about said party;
   (h) monitoring information in said database;
   (i) responsive to any change to said party's information, automatically rescreening said party for determining whether said party is approved for receiving certain goods; and
   (j) responsive to any change to said database information, automatically rescreening said party for determining whether said party is approved for receiving certain goods;
   wherein said database includes names of parties restricted from receiving certain goods;
   wherein at least one of the actions of receiving, extracting, converting, comparing, analyzing, and combining is implemented using at least one data processing system.

5. The computer program product of claim 4, further comprising computer readable code for filtering said combined result according to at least one user selectable criteria.

6. The computer program product of claim 4, wherein said computer readable program code for converting said query into a plurality of linguistic pattern strings and for comparing said plurality of linguistic pattern strings with at least one stored linguistic pattern string contained within said database to provide a set of matches is comprised of at least one of a Metaphone based analysis code, Phonex based analysis code, Soundex based analysis code, N-gram based analysis code, edit-distance based analysis code and dictionaries based analysis code.

7. A method for comparing a query against data contained within a database comprising the steps of:
   (a) receiving said query;
      wherein said query includes a party's name;
   (b) extracting a plurality of attributes from a plurality of potential match areas from said query;
      wherein said plurality of potential match areas are user selectable;
   (c) converting said plurality of attributes from said query, using at least one linguistic pattern matching analytical tool, into a plurality of linguistic pattern strings;
      wherein said at least one linguistic pattern matching analytical tool used for converting has characteristics at least some of which are user selectable;
   (d) comparing, using at least one user selectable index property, said plurality of linguistic pattern strings with at least one stored linguistic pattern string from at least one stored attribute contained within said database for providing a set of matches;
   (e) analyzing said set of matches, using said at least one linguistic pattern matching analytical tool, to provide at least one set of matched attributes;
   (f) combining all of said at least one set of matched attributes to provide a combined result;
   (g) monitoring information about said party;
   (h) monitoring information in said database;
   (i) responsive to any change to said party's information, automatically rescreening said party for determining whether said party is approved for receiving certain goods; and (j) responsive to any change to said database information, automatically rescreening said party for determining whether said party is approved for receiving certain goods;

wherein said database includes names of parties restricted from receiving certain goods;

wherein at least one of the actions of receiving, extracting, converting, comparing, analyzing, and combining is implemented using at least one data processing system.

8. The method of claim 7, further including the step of filtering said combined result according to at least one user selectable criteria.

9. The method of claim 7, further comprising the step of employing at least one of a Metaphone based analysis, a Phonex based analysis, a Soundex based analysis, an N-gram based analysis, an edit-distance based analysis and a dictionaries based analysis.

10. The method of claim 7, wherein said comparing is by edit distance.

11. The method of claim 7, further comprising the step of employing a Metaphone based analysis, a Phonex based analysis, a Soundex based analysis, an Alphabetic N-gram based analysis, a Consonant N-gram based analysis, a Numeric N-gram based analysis, an Fdi N-gram based analysis, an Fml N-gram based analysis, an edit-distance based analysis and a dictionaries based analysis.

12. The method of claim 7, further comprising designating, responsive to a match candidate containing an unusual word in an unusual words dictionary, said match candidate to be a match.

* * * * *